United States Patent
Mayhew et al.

(10) Patent No.: US 6,239,800 B1
(45) Date of Patent: *May 29, 2001

(54) METHOD AND APPARATUS FOR LEADING A USER THROUGH A SOFTWARE INSTALLATION PROCEDURE VIA INTERACTION WITH DISPLAYED GRAPHS

(75) Inventors: Debra Lee Mayhew, Morgan Hill, CA (US); Miriam Sarah Powell, Tewksbury, MA (US); David E. Shough, San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/990,326

(22) Filed: Dec. 15, 1997

(51) Int. Cl.$^7$ .................................................. G06F 3/00
(52) U.S. Cl. ..................... 345/349; 345/966; 345/967
(58) Field of Search ................................. 345/348, 965, 345/966, 338, 967, 128, 349; 395/704; 934/118

(56) References Cited

U.S. PATENT DOCUMENTS

| | | | |
|---|---|---|---|
| 3,653,667 | * 4/1972 | Primoff | 273/134 |
| 4,652,240 | * 3/1987 | Wackym | 434/307 |
| 4,901,233 | 2/1990 | Rhyne . | |
| 5,247,614 | 9/1993 | Eagen et al. . | |
| 5,276,732 | 1/1994 | Stent et al. . | |
| 5,276,883 | 1/1994 | Halliwell . | |
| 5,287,502 | * 2/1994 | Kaneko | 345/348 |
| 5,315,711 | 5/1994 | Barone et al. . | |
| 5,377,319 | * 12/1994 | Kitahara et al. | 364/200 |

(List continued on next page.)

OTHER PUBLICATIONS

Sankar L. Chakrabarti, "Synlib: The Core of CDE Tests", Hewlett–Packard Jounal, 1996.*

IBM Technical Disclosure Bulletin, vol. 34, No. 11, Apr. 1992, p 174, "Preprocessing for Remote Install Lan Requester 1.3"

IBM Technical Disclosure Bulletin, vol. 39, No. 05, May 1996, pp. 5–6, "Dynamic Serial Console Detection and Support."

Primary Examiner—Raymond J. Bayerl
Assistant Examiner—Thomas J Joseph
(74) Attorney, Agent, or Firm—Ingrid M. Foerster, Esq.; Ohlandt, Greeley, Ruggiero & Perle, LLP

(57) ABSTRACT

The invention leads a user through an application program procedure via interactions with displayed information. A method incorporating the invention first displays maps (i.e., flow charts) of tasks required to be accomplished during the application procedure. The maps include various graphical icons, each of which provides an indication of job execution status; job names that are associated with at least some of the graphical icons; and connectors between the job names which designate an execution relationship therebetween. During the application program procedure, the presentation of a graphical icon is modified to indicate a readiness of an associated job to execute. Thereafter, the user selects the associated job for execution by entering a selection signal. The graphical icon's presentation is modified to indicate completion of execution of the associated job and the presentations of one or more connectors are modified to indicate a completion of execution. A preferred application of the method of the invention is to an application program which enables installation of a complex software system such as a database, on a mainframe computer.

42 Claims, 7 Drawing Sheets

U.S. PATENT DOCUMENTS

| | | | |
|---|---|---|---|
| 5,404,527 | | 4/1995 | Irwin et al. . |
| 5,475,851 | * | 12/1995 | Kodosky et al. ............... 345/967 |
| 5,481,668 | * | 1/1996 | Marcus ........................... 345/967 |
| 5,481,740 | * | 1/1996 | Kodosky ........................ 364/181 |
| 5,530,899 | | 6/1996 | MacDonald . |
| 5,539,886 | | 7/1996 | Aldred et al. . |
| 5,555,201 | * | 9/1996 | Dangelo ......................... 364/489 |
| 5,697,788 | * | 12/1997 | Ohta ............................... 364/578 |
| 5,745,109 | * | 4/1998 | Nakano et al. ................. 345/340 |
| 5,758,122 | * | 5/1998 | Corda et al. ................... 395/500 |
| 5,790,119 | * | 8/1998 | Sklut et al. ..................... 345/349 |
| 5,793,947 | * | 8/1998 | Sakamoto ................... 364/474.03 |
| 5,825,361 | * | 10/1998 | Rubin et al. ................... 345/349 |
| 5,845,289 | * | 12/1998 | Baumeister et al. ........... 707/103 |
| 5,868,575 | * | 2/1999 | Kuczewski ..................... 434/118 |
| 5,872,569 | * | 2/1999 | Salgado et al. ................ 345/349 |
| 5,949,416 | * | 9/1999 | Bush .............................. 345/338 |
| 5,953,010 | * | 9/1999 | Kampe ........................... 345/348 |
| 5,973,687 | * | 10/1999 | Foley et al. .................... 345/334 |
| 5,999,903 | * | 12/1999 | Dionne et al. ................. 345/338 |
| 6,005,570 | * | 12/1999 | Gayraud et al. ............... 345/338 |

* cited by examiner

METHOD AND APPARATUS FOR LEADING A USER THROUGH A SOFTWARE INSTALLATION PROCEDURE VIA INTERACTION WITH DISPLAYED GRAPHS

FIELD OF THE INVENTION

This invention relates to a method and apparatus for directing a user through procedures required to install a complex software system and, more particularly, to such a method and apparatus which provides displays of graphical presentations and modifies such presentations as succeeding steps of the installation are accomplished.

BACKGROUND OF THE ART

It is known that the installation of software systems on mainframe computers requires entry of many parameters and accomplishment of a large number of steps before the software is ready to run. During the installation process, an entry error or other mistake can result in substantial time being expended to debug the data that has been entered. The prior art has attempted to cope with this problem by creating an application which helps the user through the installation process.

One example of such prior art is disclosed in the IBM Technical Disclosure Bulletin (TDB), Volume 34, No. 11, April 1992 at page 174. There, it is noted that a local area network distribution system requires a large number of user actions to set up a work station to remotely install a local area network (LAN) requestor program. Previously, the LAN administrator would be required to create map files manually for all requestors that require remote installation. The IBM TDB article suggests that a preprocessor be used to help the LAN administrator customize the set-up for remote requestors. The preprocessing program creates a map file for each work station wherein a requestor program is to be installed. For each requestor, the LAN administrator inputs the requestor's name, domain name and drive where the program will be installed. The preprocessing program reads these input parameters and creates a map file with appropriate default values. The preprocessing program is said to reduce the chance of user error by utilizing predefined inputs and by displaying appropriate error messages.

It is further known to direct a user through the various steps that are required for installing an application program. However, such installation instructions are generally set out as a listed series of jobs to accomplish, with little information being given as to their interrelationship, the status of various tasks which comprise the overall job, or the overall relationship of the various subtasks to each other and to the job as a whole.

In fact to successfully install a complex program , it is often a necessity that the user be an expert on how to install the program, on how to adapt and/or alter parameters that are inserted during the installation procedure, etc., etc.

Accordingly, it is an object of this invention to provide an improved method for leading a user through the various steps of installing a program on a computer.

It is another object of this invention to provide an improved method and apparatus for enabling installation of a software program which enables the user to comprehend the readiness of a task to execute during the installation process.

It is yet another object of this invention to provide an improved method for enabling a user to install a software program on a computer, which method provides the user with a visual feedback as to the state of execution of each job that is involved in the installation process.

SUMMARY OF THE INVENTION

The invention leads a user through an application program procedure via interactions with displayed information. A method incorporating the invention first displays maps (i.e., flow charts) of tasks required to be accomplished during the application procedure. The maps include various graphical icons, each of which provides an indication of job execution status; job names that are associated with at least some of the graphical icons; and connectors between the job names which designate an execution relationship therebetween. During the application program procedure, the presentation of a graphical icon is modified to indicate a readiness of an associated job to execute. Thereafter, the user selects the associated job for execution by entering a selection signal. The graphical icon's presentation is modified to indicate completion of execution of the associated job and the presentations of one or more connectors are modified to indicate a completion of execution. A preferred application of the method of the invention is to an application program which enables installation of a complex software system such as a database, on a mainframe computer.

DETAILED DESCRIPTION OF THE INVENTION

Hereafter, the invention will be described in the context of an application program which enables a user to install a complex database system on a mainframe computer. The installation is carried out at the user's computer terminal under control of the application program. It is to be understood, however, that the invention is widely applicable to assisting a user through many interactions with complex programs.

Figure 1:
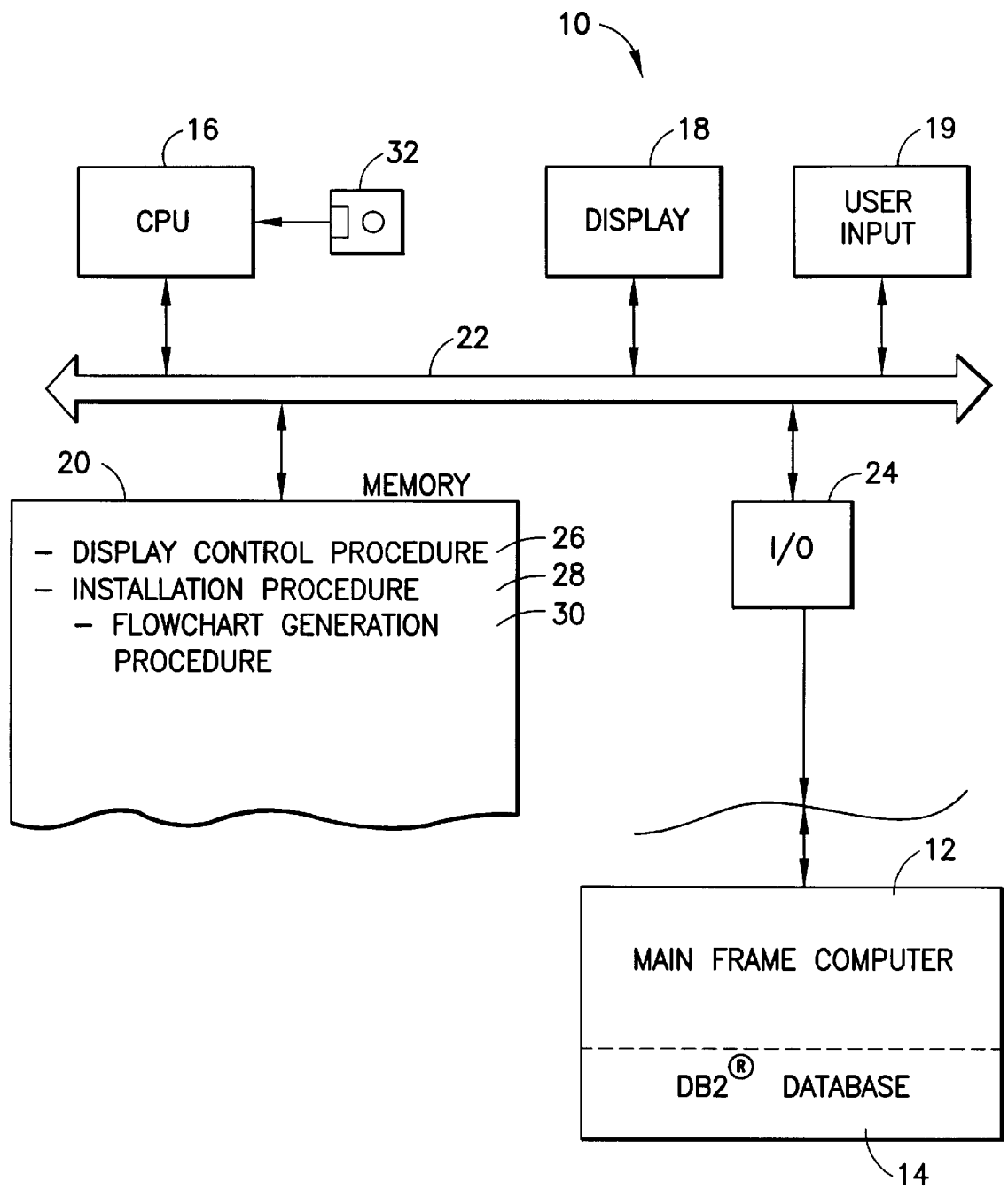
FIG. 1 is a block diagram of a system that is particularly adapted to perform the method of the invention.

Referring to FIG. 1, user computer 10 is connected to a mainframe computer 12 on which a database system 14 is to be installed. In this instance, it will be assumed that the database system is the DB2 database, a product of the International Business Machines Corporation (IBM). DB2 and IBM are registered trademarks of the International Business Machines Corporation. To properly install DB2 database 14 on computer 12 requires customization of hundreds of parameters, performance of many interrelated functions, and has been usually carried out by an expert, directly at an interface with computer 12.

The provision of user computer 10 and certain software systems installed thereon provides to the relatively unskilled user, the means to accomplish the aforesaid installation. Computer 10 includes a central processing unit (CPU) 16, a display 18, a user input 19 and a memory 20, all of which are coupled via bus system 22. Communications between computer 10 and mainframe computer 12 are carried out via an input/output module 24. Among the many control procedures that are loaded into memory 20 is a display control procedure 26 which, in conjunction with CPU 16, operates display 18. An installation procedure 28 is also stored within memory 20 and includes a flow chart generation procedure 30 to be described in detail below.

Installation procedure 28 provides detailed flow charts for presentation on display 18. Those flow charts lead a user through the multiple steps required to accomplish installation of DB2 database 14 on mainframe computer 12. Each of the flow charts presented on display 18 include individual names of jobs which are required to be accomplished during the installation process; graphical connectors between the job names indicating an execution relationship therebetween and, in many of the flow charts, graphical icons which provide an indication of each job's execution status. As various jobs are accomplished, the presentation state of the job names and/or graphical icons are changed to indicate an altered state of the installation process.

Further, the graphical presentation of each flow chart is arranged so that the order of the jobs to be executed is clearly presented. For instance, steps that can be executed in any order with respect to one another are shown along a same row, whereas steps that have definite order of execution with respect to each other are shown in a connected column. Further, in addition to showing the status of each job in the process, installation procedure 28 prompts the user to insert a specific parameter at each job which requires a parameter input. Also, the parameters are "layered" in the sense that the user is only prompted for the most important ones and those of lesser importance are set to default values and are hidden from the user to be later accessed, if required.

While each of display control procedure 26, installation procedure 28 and flow chart generation procedure 30 are shown as loaded into memory 20, it is to be understood that the aforesaid procedures can be loaded into CPU 16 via a memory disk, tape or other storage device 32 in the well known manner. In either case, the operation of computer 10, in carrying out the functions of the invention, is controlled by the procedures and data stored in either memory 20 or in storage device 32.

Turning now to FIGS. 2–7, a plurality of screens will be described which are provided to display control procedure 26 by installation procedure 28, under control of flow chart generation procedure 30. The screens are presented on display 18 and enable a user to respond to icons, commands and/or queries which appear on display 18. User inputs are applied via user input device 19 which may be a keyboard, mouse or other graphical input device.

Figure 2:
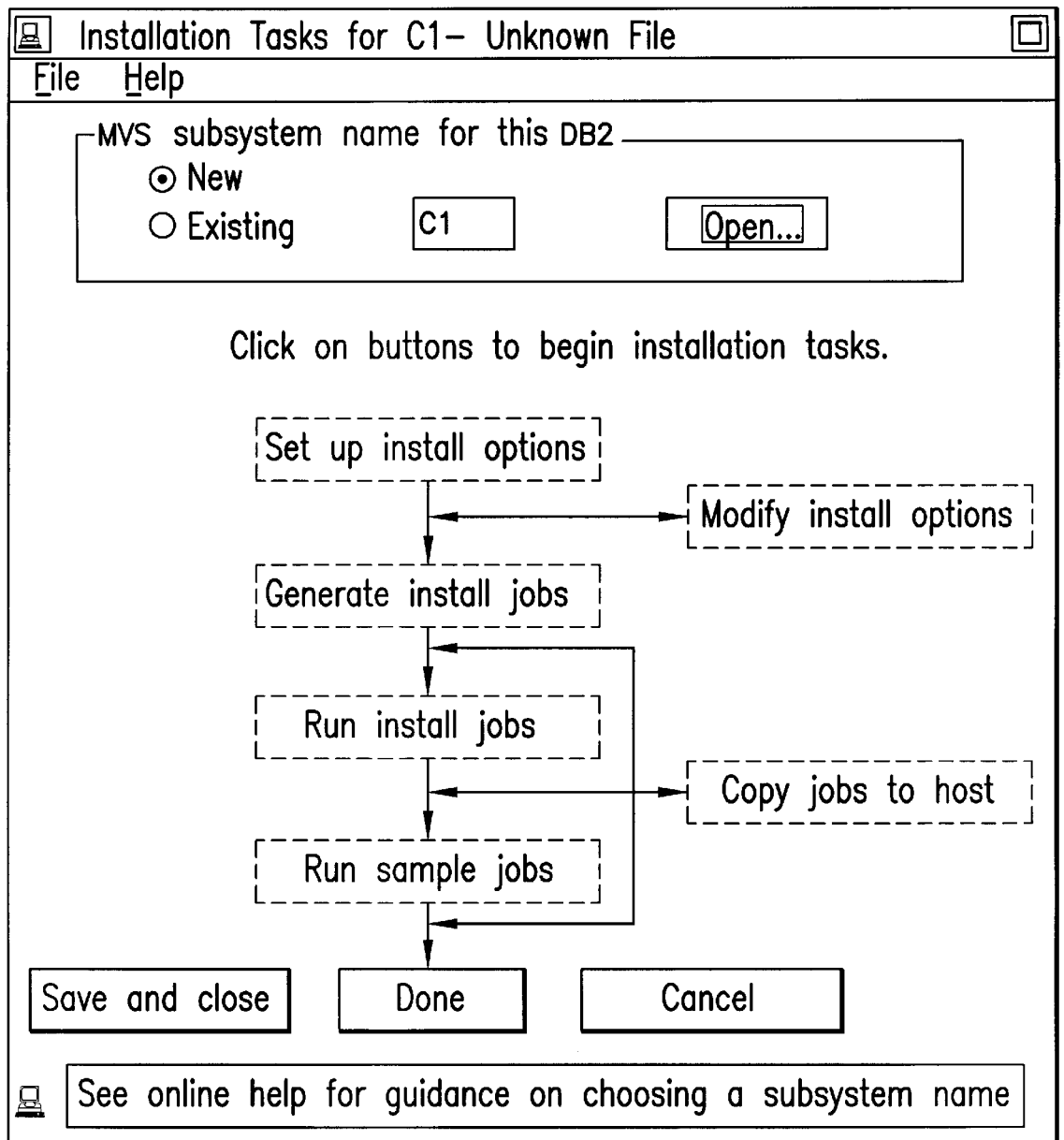
FIGS. 2–7 are representative displays which are presented to a user during the operation of the invention to guide the user through a particular application procedure.

Turning to FIG. 2, and in the context of the installation of a DB2 database, screen 50 is presented as an initial screen by installation procedure 28. Screen 50 illustrates a number of major jobs that are to be accomplished during the installation procedure. Each job is illustrated by a box with the title of the job presented therein. The jobs are linked by graphical connectors which indicate the relationships of the jobs, whether sequential, independent or otherwise. Jobs which have not yet commenced are shown in boxes having a first attribute, i.e., a color, a background pattern, an uncolored background, etc.

Accordingly, by inspection of the graph, the user is enabled to determine which of the jobs have been completed and which are yet to be completed. Further, as will become apparent from the description below, the graphical connectors between boxes are modified to further illustrate the completion of the various jobs involved in the installation process.

Figure 3:
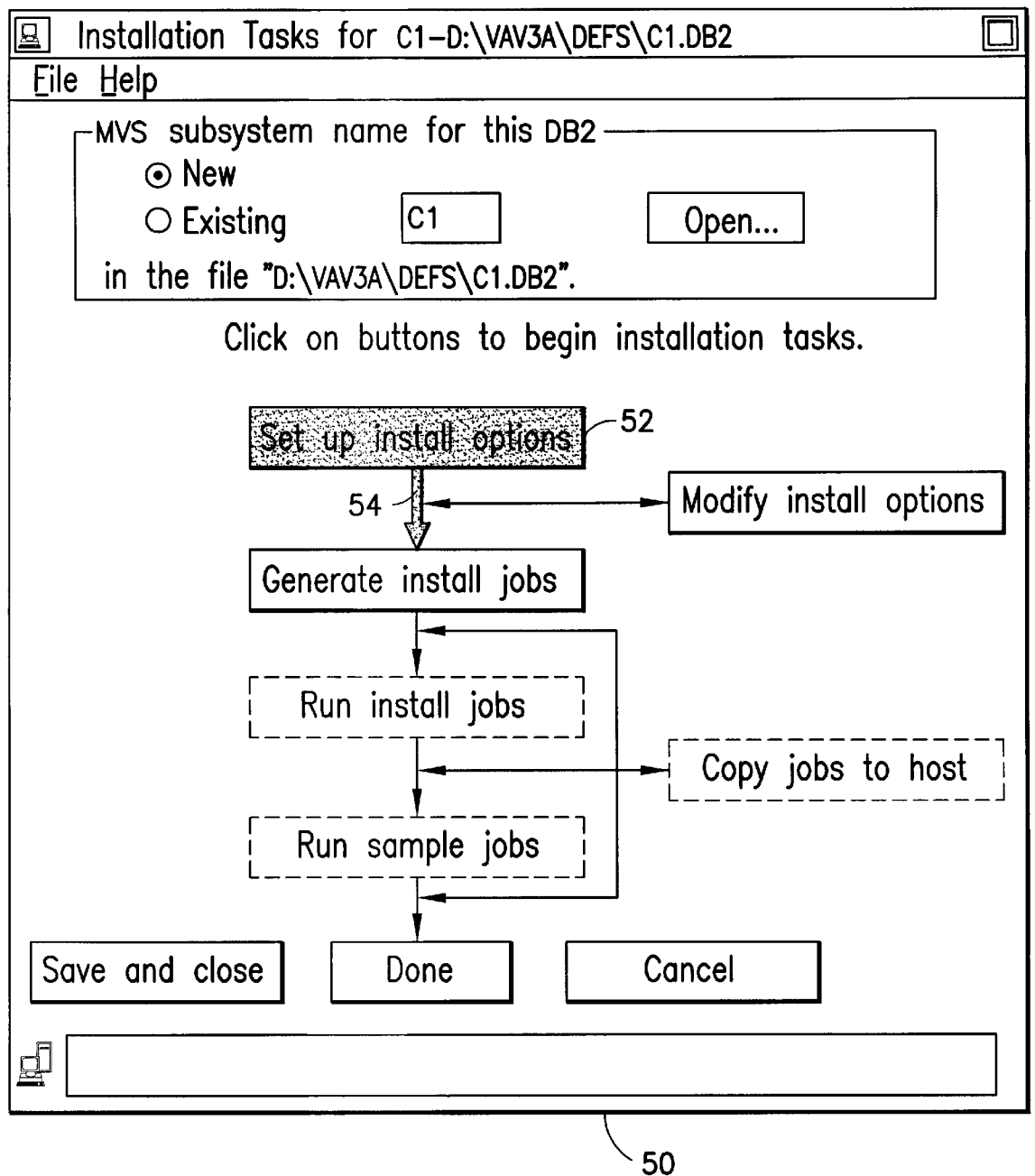

Turning to FIG. 3, note that box 52 in screen 50 is now presented with a different attribute so as to indicate to the user the completion of the job "Set up install options". Further, to indicate the next job to be accomplished, connector 54 is displayed with a different attribute than that utilized in FIG. 2. The attribute may be color, pattern or other distinguishing presentation which enables the connection status to be understood by the user.

Figure 4:
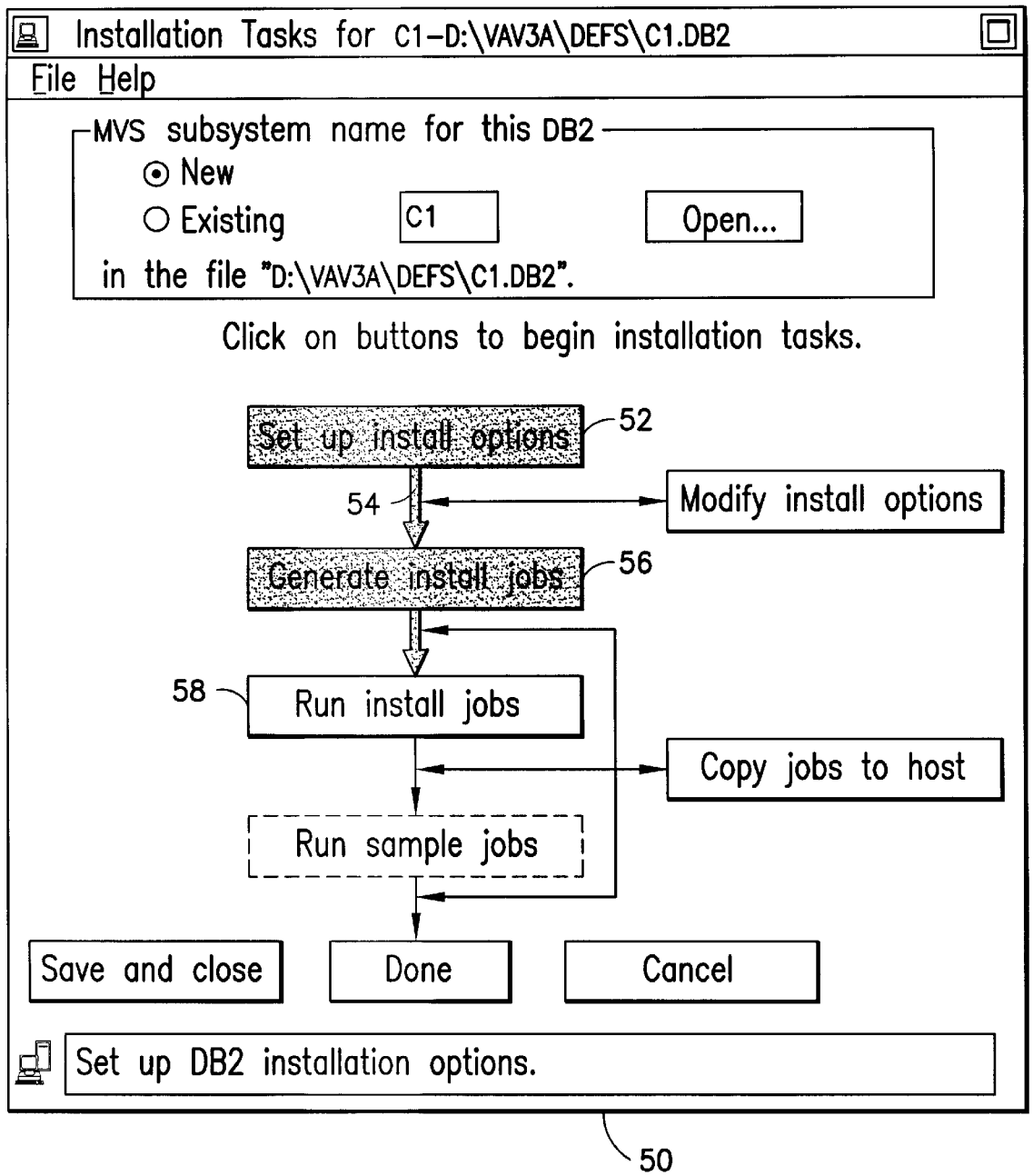
Figure 5:
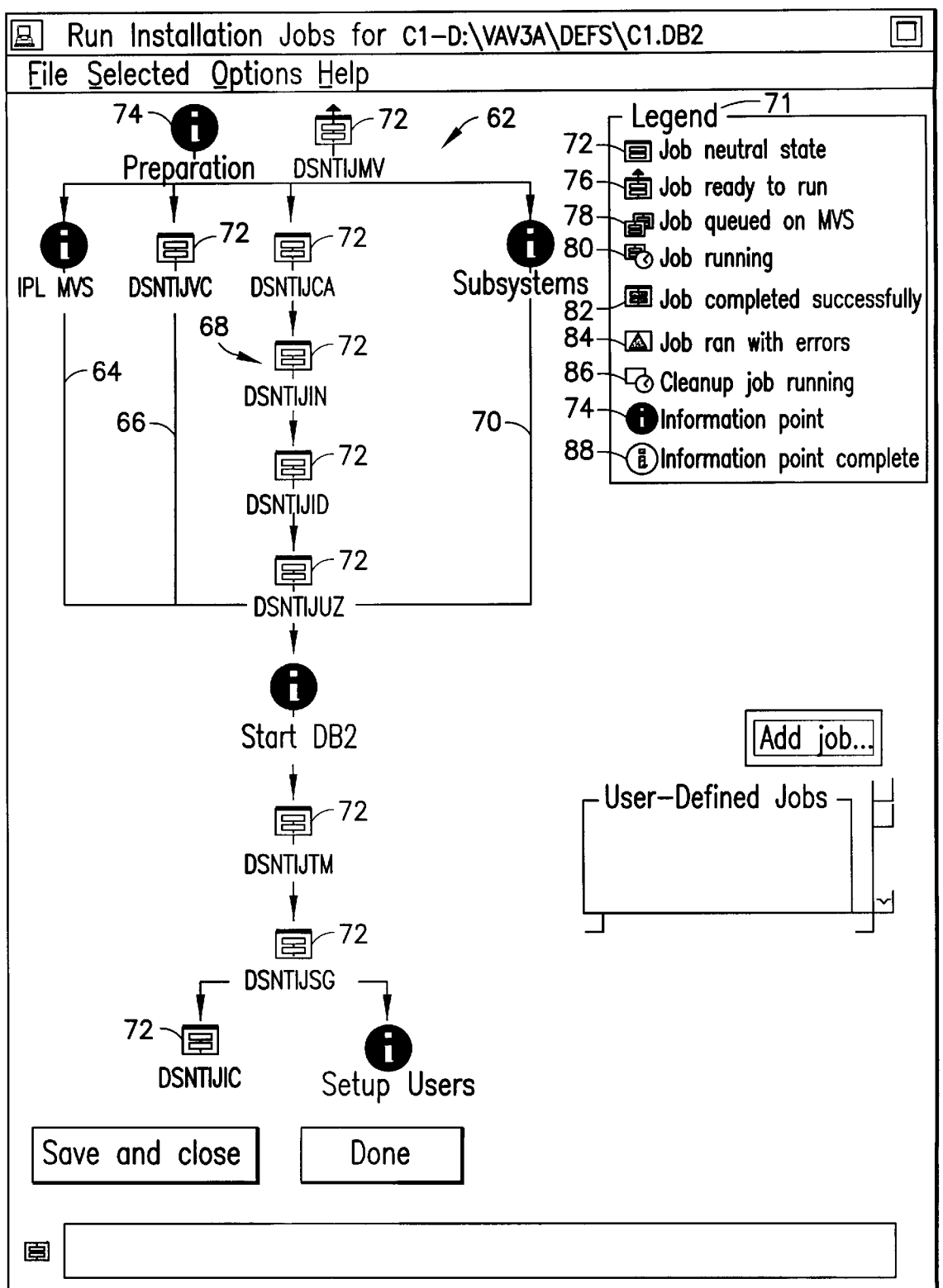

FIG. 4 illustrates the condition of screen 50 after a second job, "Generate installed jobs" has been completed. More specifically, data entered by a user via user input 19 is used by installation procedure 28 to tailor jobs for submission to the operating system of mainframe computer 12. Thereafter, flow chart generation procedure 30 is operated to modify the screen presentation to indicate the state of execution of the overall installation process.

While FIGS. 2–4 illustrate the sequential operation of high level jobs, certain jobs comprise many tasks which require user interaction. Thus, for instance, the job "Run installed jobs" shown in box 58 in FIG. 4 is one such job and its plural tasks are illustrated in screen 60 shown in FIG. 5. In this instance, flow chart generation procedure 30 provides a multipath flow chart 62 which comprises four legs, 64, 66, 68 and 70. Each of legs 64, 66, 68 and 70 must be traversed by the user in order to accomplish the indicated installation action. Flow chart 62 includes a plurality of icons 72 which indicate (see legend 71) that the task denoted by the task title immediately below the icon is in a neutral state and not yet ready to run.

An icon 74 is an "information point" which provides information to the user to aid in further traversal of flow chart 62. Note that legend 71 indicates the various icons that are utilized to indicate the state of each respectively associated task title. More specifically, icon 72 indicates that the task is in a neutral state; icon 74 indicates an information point; icon 76 indicates that the associated task is ready to run; icon 78 indicates that the task is queued on mainframe computer 12 (under control of the MVS operating system); icon 80 indicates that the respectively associated task is running; icon 82 indicates that the task has been completed successfully; icon 84 indicates that the task ran with error; and icon 86 indicates that a cleanup task is running. If an information point has been traversed, icon 88 is displayed.

In order to commence the installation action, the user, through operation of user input device 19 clicks on the uppermost icon 72 that lies above task name DSNTIJMV in screen 60. The task represented by that icon is then ready to run (i.e., icon 76 appears). Then the user, through the menu bar, activates a pull-down window (not shown) and selects a "Run" option. This action instructs mainframe computer 12 to run the task. Thereafter, the icon associated with the task DSNTIJMV is successively changed to indicate the current status of the task, as such status is communicated back from the mainframe.

Figure 6:
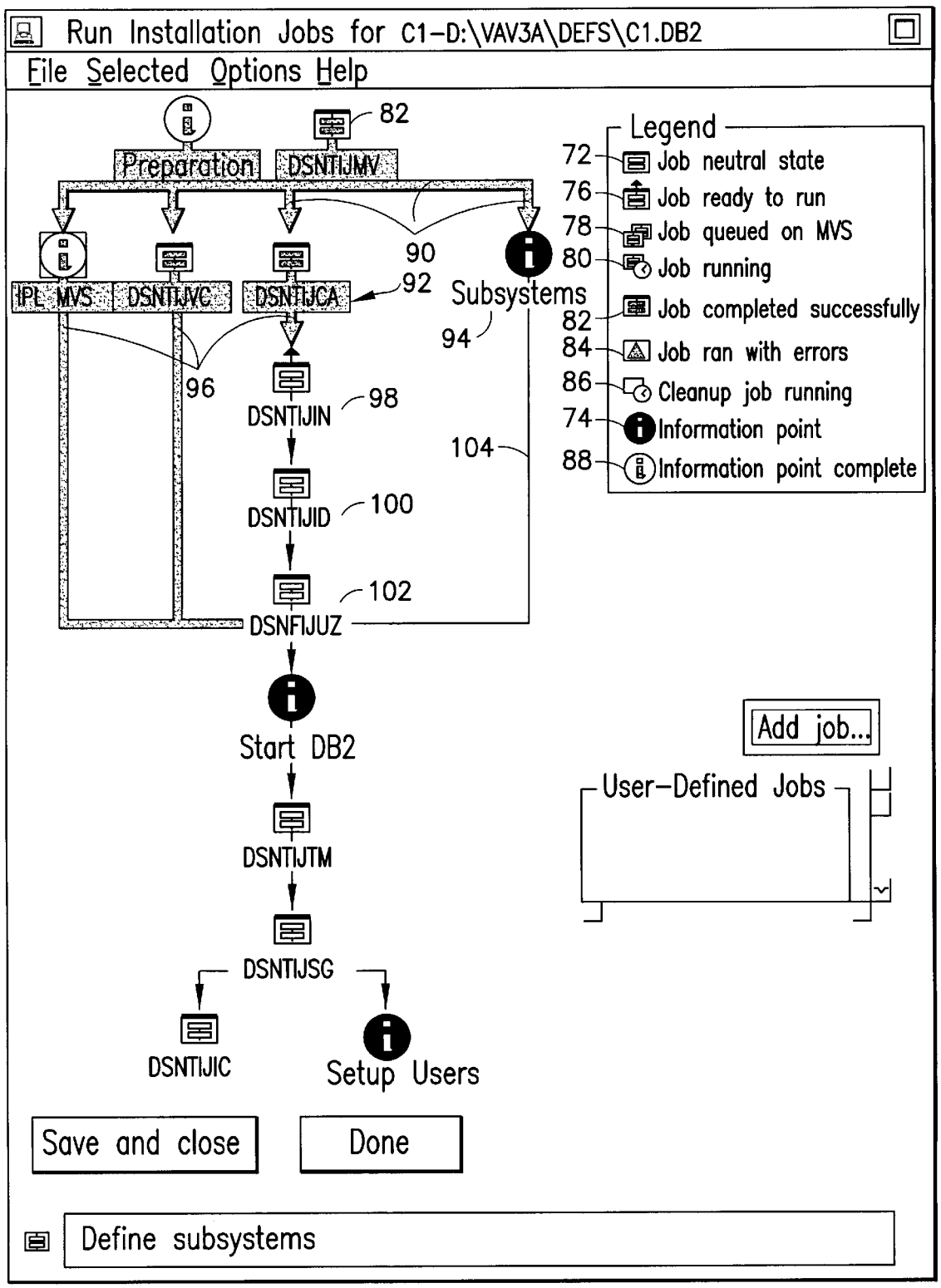

At the completion of a task, icon 82 is displayed (see FIG. 6). In addition, if both information point 74 (PREPARATION) and job DSNTIJMV have been completed, the presentation of connector 90 is altered to show the user which next tasks are to be performed. In FIG. 6, each of the tasks along row 92 have been finished, except for "subsystems" information point 94. Accordingly each of the connectors 96 indicates an altered attribute to notify the user of completion of the previous tasks and which tasks are next to be commenced. Note that task 98 has changed appearance to indicate that it is ready to run. The arrangement of tasks 98, 100 and 102 indicates a sequential dependency therebetween. Further, task 102 cannot be completed until each of connectors 96 and 104 indicate an altered presentation (notifying the user of the completion of the immediately connected task titles).

Figure 7:
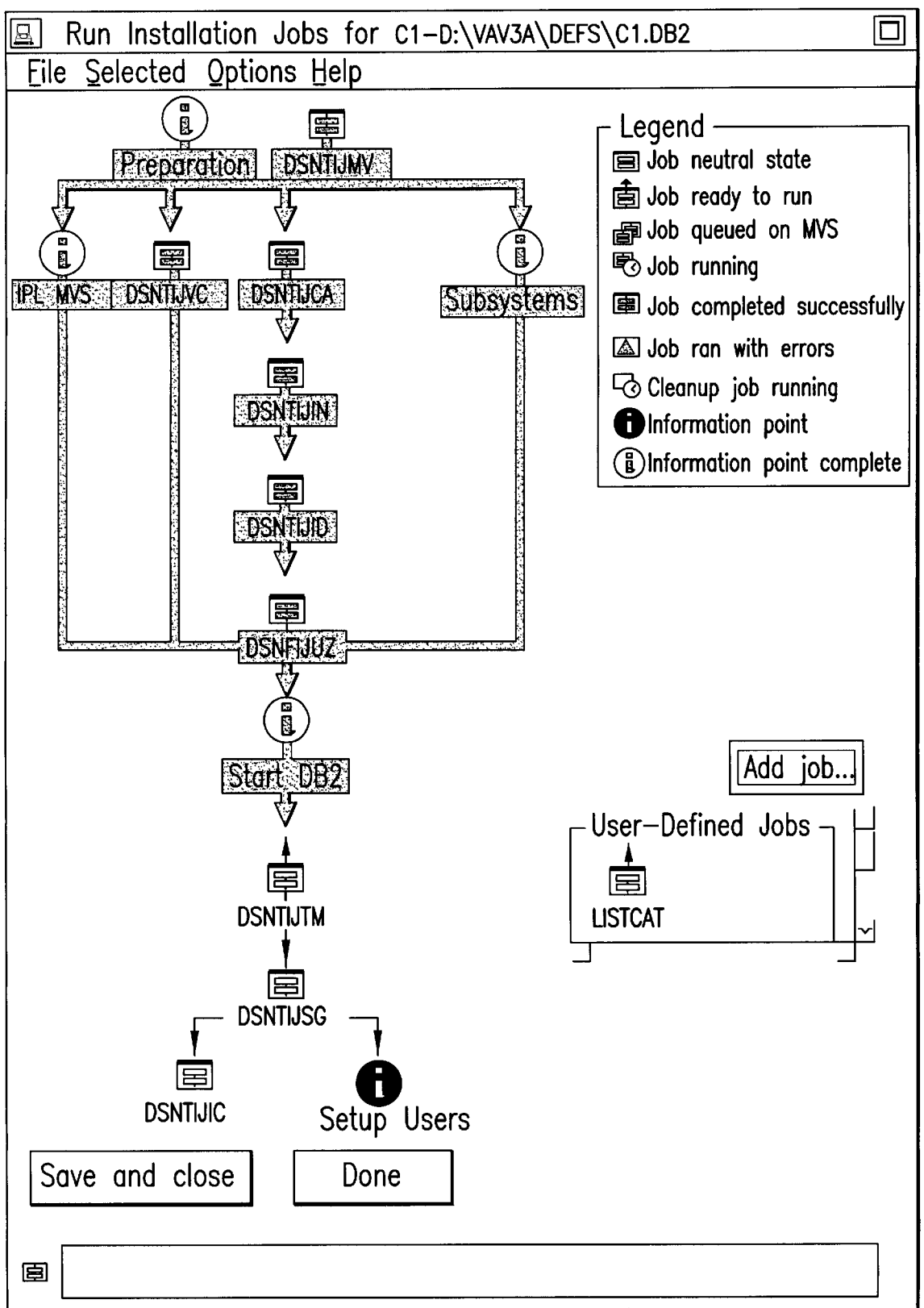

Turning to FIG. 7, a further screen 110 is illustrated which shows the changes in state of the various connectors and task title presentations as succeeding tasks are accomplished. Note that as each task completes, a background attribute for the task title is changed, as well as altering the attribute of the descending connector therefrom. Further, the icon presentation is altered to show both the state of the task and, at its completion, the completed state of the task.

When all tasks have been completed that are illustrated on screen 110, the presentation returns to screen 50, shown in FIG. 4. However, the "Run install jobs" box 54 now includes a job complete attribute (e.g., revised color background, etc.). Further, the next job to be accomplished, i.e., "Run sample jobs" is modified as to attribute so as to indicate the next high level job to be performed.

Accordingly, the invention enables the user to work through a complex application procedure using visual queues which enable an understanding of the state of execution of each job. Further, not only do the illustrated flow charts provide the user with a presentation of job/task state, but they also provide the user with an indication of the required sequence of jobs and the relationship of jobs which must be accomplished before a succeeding job can be commenced.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for leading a user through a procedure on a computer via interactions with information presented on a display, comprising the steps of:
   a) displaying a map of a plurality of tasks in a plurality of paths that must each be traversed by said user during said procedure, said map comprising (1) for each of said plurality of tasks, an associated graphical icon that indicates a task execution status, and (2) graphical connectors between said graphical icons that designate an execution relationship between said plurality of tasks;
   b) controlling program flow through said procedure in accordance with a selection, by said user, of one of said plurality of tasks from said map; and
   c) modifying said graphical icon associated with said selected task.

2. The method as recited in claim 1, wherein step c) modifies said graphical icon associated with said selected task to indicate a completion of execution of said selected task.

3. The method as recited in claim 1, wherein step c) modifies said graphical icon associated with said selected task to indicate an executing status of said selected task.

4. The method as recited in claim 1, further comprising modifying said graphical icons in different forms to indicate that a (i) task is in a neutral state, (ii) task is ready to execute, (iii) task is queued, (iv) task is running, (v) task completed unsuccessfully, or (vi) task ran with errors.

5. The method as recited in claim 1, further comprising modifying a presentation of said graphical connectors to indicate an overall progress in execution of said procedure.

6. The method as recited in claim 1, further comprising modifying a presentation of a connector to indicate a completion of execution of said selected task.

7. The method as recited in claim 6, wherein said modifying of said presentation of a connector is accomplished by modifying a color attribute that is assigned thereto.

8. The method as recited in claim 6, wherein said modifying of said presentation of a connector is accomplished by modifying a thickness attribute that is assigned thereto.

9. The method as recited in claim 1, further comprising, before said controlling step, the step of modifying a presentation of one of said graphical icons to indicate a readiness to execute of an associated task.

10. The method as recited in claim 1, wherein said graphic connectors indicate which of said plurality of tasks are next to be commenced.

11. The method as recited in claim 1, wherein members of said plurality of tasks that can be executed in any order with respect to one another are displayed along a same row, and members of said plurality of tasks that have a definite order of execution with respect to each other are displayed in a connected column.

12. The method as recited in claim 1, wherein said procedure comprises a software installation procedure.

13. The method as recited in claim 1, wherein said map of said plurality of tasks comprises a first path comprising a first subset of said plurality of tasks, and a second path in parallel with said first path and comprising a second subset of said plurality of tasks.

14. The method as recited in claim 13, wherein said map of said plurality of tasks further comprises a subsequent task, and wherein said first subset of said plurality of tasks and said second subset of said plurality of tasks must be completed before commencement of said subsequent task.

15. A memory media for controlling a computer to lead a user through a procedure via interactions with information presented on a display, comprising:
   a) means for controlling said computer to display a map of a plurality of tasks in a plurality of paths that must each be traversed by said user during said procedure, said map comprising (1) for each of said plurality of tasks, an associated graphical icon that indicates a task execution status, and (2) graphical connectors between said graphical icons that designate an execution relationship between said plurality of tasks;
   b) means for controlling said computer to control program flow through said procedure in accordance with a selection, by said user, of one of said plurality of tasks from said map; and
   c) means for controlling said computer to modify said graphical icon associated with said selected task.

16. The memory media as recited in claim 15, wherein means c) causes modification of said graphical icon associated with said selected task to indicate a completion of execution of said selected task.

17. The memory media as recited in claim 15, wherein means c) causes modification of said graphical icon associated with said selected task to indicate an executing status of said selected task.

18. The memory media as recited in claim 15, further comprising means for controlling said computer to display said graphical icons in different forms to indicate that a (i) task is in a neutral state, (ii) task is ready to execute, (iii) task is queued, (iv) task is running, (v) task completed unsuccessfully, or (vi) task ran with errors.

19. The memory media as recited in claim 15, further comprising means for controlling said computer to display a presentation of said graphical connectors to indicate an overall progress in execution of said procedure.

20. The memory media as recited in claim 15, further comprising means for controlling said computer to modify a presentation of a connector to indicate a completion of execution of said selected task.

21. The memory media as recited in claim 20, wherein said modifying of said presentation of a connector is accomplished by modifying a color attribute that is assigned thereto.

22. The memory media as recited in claim 20, wherein said modifying of said presentation of a connector is accomplished by modifying a thickness attribute that is assigned thereto.

23. The memory media as recited in claim 15, wherein said map of said plurality of tasks comprises a first path comprising a first subset of said plurality of tasks, and a second path in parallel with said first path and comprising a second subset of said plurality of tasks.

24. The memory media as recited in claim 23, wherein said map of said plurality of tasks further comprises a subsequent task, and wherein said first subset of said plurality of tasks and said second subset of said plurality of tasks must be completed before commencement of said subsequent task.

25. The memory media as recited in claim 15, further comprising means for controlling said computer to modify a presentation of one of said graphical icons to indicate a readiness to execute of an associated task.

26. The memory media as recited in claim 15, wherein said graphic connectors indicate which of said plurality of tasks are next to be commenced.

27. The memory media as recited in claim 15, wherein members of said plurality of tasks that can be executed in any order with respect to one another are displayed along a same row, and members of said plurality of tasks that have a definite order of execution with respect to each other are displayed in a connected column.

28. The memory media as recited in claim 15, wherein said procedure comprises a software installation procedure.

29. A computer system comprising:
  a display;
  a memory including instructions for controlling the computer system to lead a user through a procedure via interactions with information shown on said display; and
  a central processor unit (CPU) for operating in conjunction with said instructions and said display, said CPU:
    a) causing said display to show a map of a plurality of tasks in a plurality of paths that must each be traversed by said user during said procedure, said map comprising (1) for each of said plurality of tasks, an associated graphical icon that indicates a task execution status, and (2) graphical connectors between said graphical icons that designate an execution relationship between said plurality of tasks;
    b) controlling program flow through said procedure in accordance with a selection, by said user, of one of said plurality of tasks from said map; and
    d) causing said display to modify said graphical icon associated with said selected task.

30. The computer system as recited in claim 29, wherein said computer causes said display to modify said graphical icon associated with said selected task to indicate a completion of execution of said selected task.

31. The computer system as recited in claim 29, wherein said CPU causes said display to modify said graphical icon associated with said selected task to indicate an executing status of said selected task.

32. The computer system as recited in claim 29, wherein said CPU causes said display to display said graphical icons in different forms to indicate that a (i) task is in a neutral state, (ii) task is ready to execute, (iii) task is queued, (iv) task is running, (v) task completed unsuccessfully, or (vi) task ran with errors.

33. The computer system as recited in claim 29, wherein said CPU causes said display to modify a presentation of said graphical connectors to indicate an overall progress in execution of said procedure.

34. The computer system as recited in claim 29, wherein said CPU controls said display to modify a presentation of a connector to indicate a completion of execution of said selected task.

35. The computer system as recited in claim 34, wherein said modifying of said presentation of a connector is accomplished by modifying a color attribute that is assigned thereto.

36. The computer system as recited in claim 34, wherein said modifying of said presentation of a connector is accomplished by modifying a thickness attribute that is assigned thereto.

37. The computer system as recited in claim 29, wherein said map of said plurality of tasks comprises a first path comprising a first subset of said plurality of tasks, and a second path in parallel with said first path and comprising a second subset of said plurality of tasks.

38. The computer system of claim 37, wherein said map of said plurality of tasks further comprises a subsequent task, and wherein said first subset of said plurality of tasks and said second subset of said plurality of tasks must be completed before commencement of said subsequent task.

39. The computer system as recited in claim 29, wherein said CPU modifies a presentation of one of said graphical icons to indicate a readiness to execute of an associated task.

40. The computer system as recited in claim 29, wherein said graphic connectors indicate which of said plurality of tasks are next to be commenced.

41. The computer system as recited in claim 29, wherein members of said plurality of tasks that can be executed in any order with respect to one another are displayed along a same row, and members of said plurality of tasks that have a definite order of execution with respect to each other are displayed in a connected column.

42. The computer system as recited in claim 29, wherein said procedure comprises a software installation procedure.

* * * * *